United States Patent
Sturgin et al.

(10) Patent No.: US 9,951,857 B2
(45) Date of Patent: Apr. 24, 2018

(54) TORQUE TRANSMITTING ASSEMBLY INCLUDING A SPROCKET ASSEMBLY DISPLACEABLE ALONG A SHAFT AND METHOD THEREOF

(71) Applicant: Schaeffler Technologies AG & Co. KG, Herzogenaurach (DE)

(72) Inventors: Todd J. Sturgin, Wooster, OH (US); Chris Luipold, Wadsworth, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 392 days.

(21) Appl. No.: 14/751,873

(22) Filed: Jun. 26, 2015

(65) Prior Publication Data
US 2016/0040773 A1 Feb. 11, 2016

Related U.S. Application Data

(60) Provisional application No. 62/033,406, filed on Aug. 5, 2014.

(51) Int. Cl.
*F16H 57/00* (2012.01)

(52) U.S. Cl.
CPC ................... *F16H 57/0025* (2013.01)

(58) Field of Classification Search
CPC ....... F16H 57/0025; F16D 1/12; F16D 11/006
See application file for complete search history.

(56) References Cited

U.S. PATENT DOCUMENTS

| | | | | |
|---|---|---|---|---|
| 3,921,771 A | * | 11/1975 | Szabo | F16D 67/02 192/12 BA |
| 4,164,153 A | * | 8/1979 | Moritsch | B62M 9/08 280/236 |
| 4,427,399 A | * | 1/1984 | Rudolph | F16D 7/046 192/56.61 |
| 4,750,376 A | * | 6/1988 | Walker | B62M 9/08 280/259 |
| 5,113,985 A | * | 5/1992 | Frost | F16D 23/06 192/53.341 |
| 8,776,349 B2 | * | 7/2014 | Park | B23P 19/04 29/270 |
| 9,719,564 B2 | * | 8/2017 | Perosky | F16D 23/06 |
| 2008/0214313 A1 | * | 9/2008 | Jaeger | F16D 7/048 464/38 |

* cited by examiner

*Primary Examiner* — David M Fenstermacher
(74) *Attorney, Agent, or Firm* — Brooks Kushman P.C.

(57) ABSTRACT

A torque transmitting assembly, including: a shaft including a longitudinal axis, first and second longitudinal ends, a radially outermost surface, a first portion including at least one indentation, and second and third portions between the first portion and the first and second longitudinal ends, respectively; and a sprocket assembly disposed about the shaft and including a sprocket with a circumferentially disposed and radially outwardly extending teeth and at least one key engaged with the sprocket. The sprocket assembly is displaceable along the shaft to displace the at least one key into the at least one indentation. The sprocket is non-rotatably connected the shaft when the at least one key is disposed in the at least one indentation. At least respective portions of the radially outermost surface are at a uniform distance from the longitudinal axis in a radial direction orthogonal to the longitudinal axis and extending from the longitudinal axis.

20 Claims, 9 Drawing Sheets

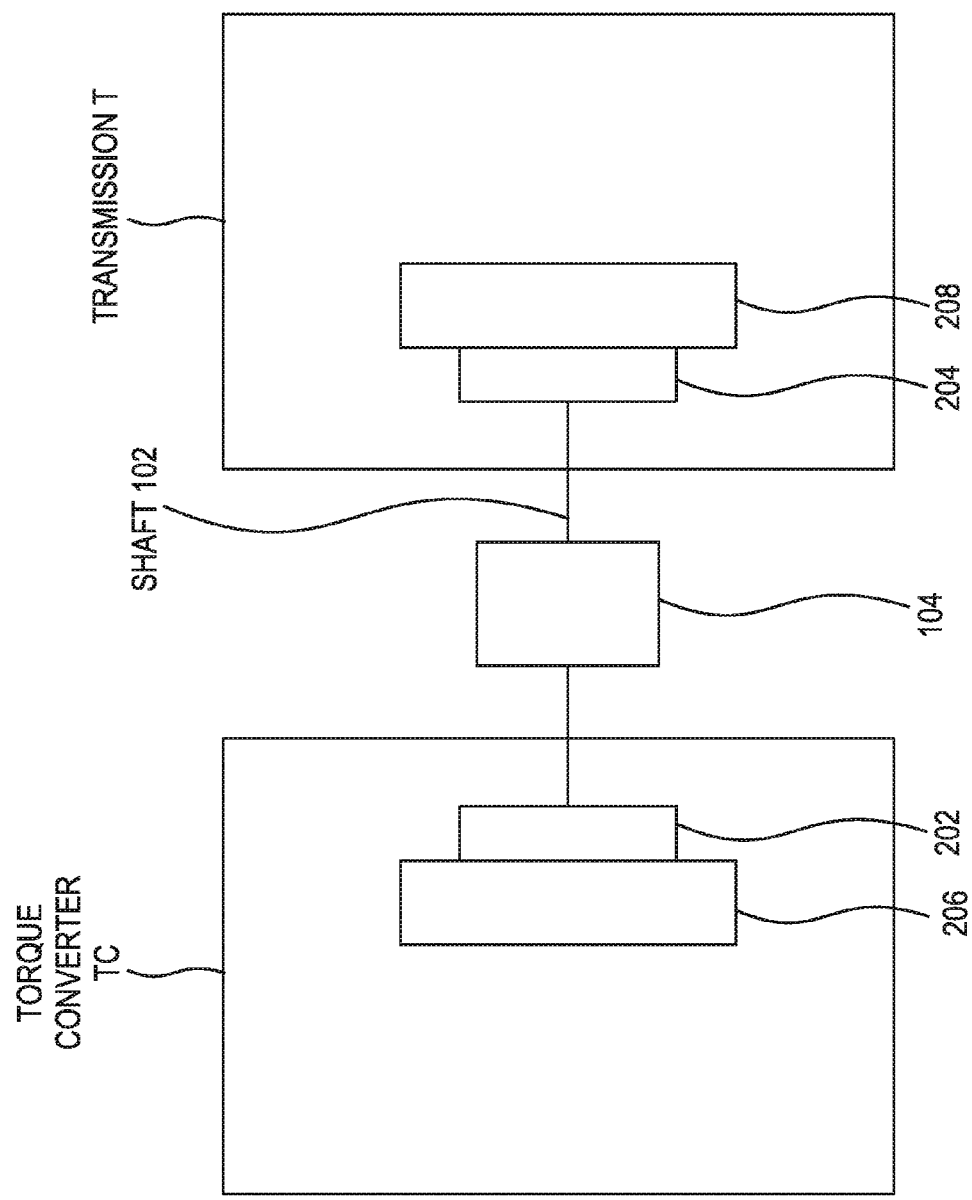

TORQUE TRANSMITTING ASSEMBLY INCLUDING A SPROCKET ASSEMBLY DISPLACEABLE ALONG A SHAFT AND METHOD THEREOF

CROSS-REFERENCE TO RELATED APPLICATIONS

This application claims the benefit under 35 U.S.C. § 119(e) of U.S. Provisional Patent Application No. 62/033,406, filed Aug. 5, 2014, which application is incorporated herein by reference in its entirety.

TECHNICAL FIELD

The present disclosure relates to a torque assembly including a shaft and a sprocket assembly displaceable along the shaft. In particular, the sprocket assembly is axially displaceable along the shaft to assume a position in which the sprocket assembly is non-rotatably connected to the shaft, and the sprocket assembly is axially displaceable along the shaft to transition out of the non-rotatably connected position, for example, to remove the sprocket assembly from the shaft. In an example embodiment, the shaft is an input shaft for a transmission.

BACKGROUND

In known torque converter and transmission configurations, portions of the input shaft that could be used for providing torque to components outside of the torque converter and transmission are inaccessible and/or torque transmitting components, such as a sprocket, cannot be mounted to the shaft. For example, the sprocket would need to be rotationally fixed to the shaft during assembly. Radially extending keys on the shaft mated to grooves in the sprocket could be used to fix the sprocket; however, the keys would interfere with bushings that must be installed on the shaft to engage the torque converter housing and stator shaft support. Grooves in the shaft mated with keys extending from the sprocket could be used; however the grooves would provide leak paths past the bushings. The sprocket cannot be welded to the shaft, since the sprocket must be removable to enable disassembly and repair of the transmission.

SUMMARY

According to aspects illustrated herein, there is provided a torque transmitting assembly, including: a shaft including a longitudinal axis, first and second longitudinal ends through which the longitudinal axis passes, a radially outermost surface, a first portion including at least one indentation, and second and third portions between the first portion and the first and second longitudinal ends, respectively; and a sprocket assembly disposed about the shaft and including a sprocket with a plurality of circumferentially disposed and radially outwardly extending teeth and at least one key engaged with the sprocket. The sprocket assembly is displaceable along the shaft to displace the at least one key into the at least one indentation. The sprocket is non-rotatably connected the shaft when the at least one key is disposed in the at least one indentation. At least respective portions of the radially outermost surface are at a uniform distance from the longitudinal axis in a first radial direction orthogonal to the longitudinal axis and extending from the longitudinal axis.

According to aspects illustrated herein, there is provided a torque transmitting assembly, including: an input shaft for a transmission, the input shaft including a first portion with at least one indentation and, second and third portions between the first portion and first and second longitudinal ends of the shaft, respectively; and a sprocket assembly radially disposed about the shaft and including a sprocket with a plurality of circumferentially disposed radially outwardly extending teeth and at least one key. The at least one indentation terminates at respective boundaries between the first portion and the second portion and between the first portion and the third portion. The sprocket assembly is displaceable along the shaft: in a first axial direction from the second portion to the first portion to displace the at least one key into the at least one indentation; and in the first axial direction or in a second axial direction, opposite the first axial direction, from the first portion, with the at least one key displaced into the at least one indentation, to the third portion or second portion, respectively. When the sprocket assembly is radially disposed about the first portion: the at least one key is engaged with the at least one first indentation to non-rotatably connect the sprocket and the shaft; or the sprocket assembly is rotatable about the shaft to engage the at least one key with the at least one first indentation to non-rotatably connect the sprocket and the shaft.

According to aspects illustrated herein, there is provided a torque transmitting assembly, including a shaft and a sprocket. The shaft includes: a longitudinal axis; first and second longitudinal ends through which the longitudinal axis passes; a first portion including at least one indentation; and second and third portions between the first portion and the first and second longitudinal ends, respectively. The sprocket includes a plurality of circumferentially disposed and radially outwardly extending teeth. The sprocket is displaceable along the shaft to engage the at least one indentation to non-rotatably connect the sprocket and the shaft. The sprocket is rotatable for 360 degrees about the second and third portions.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
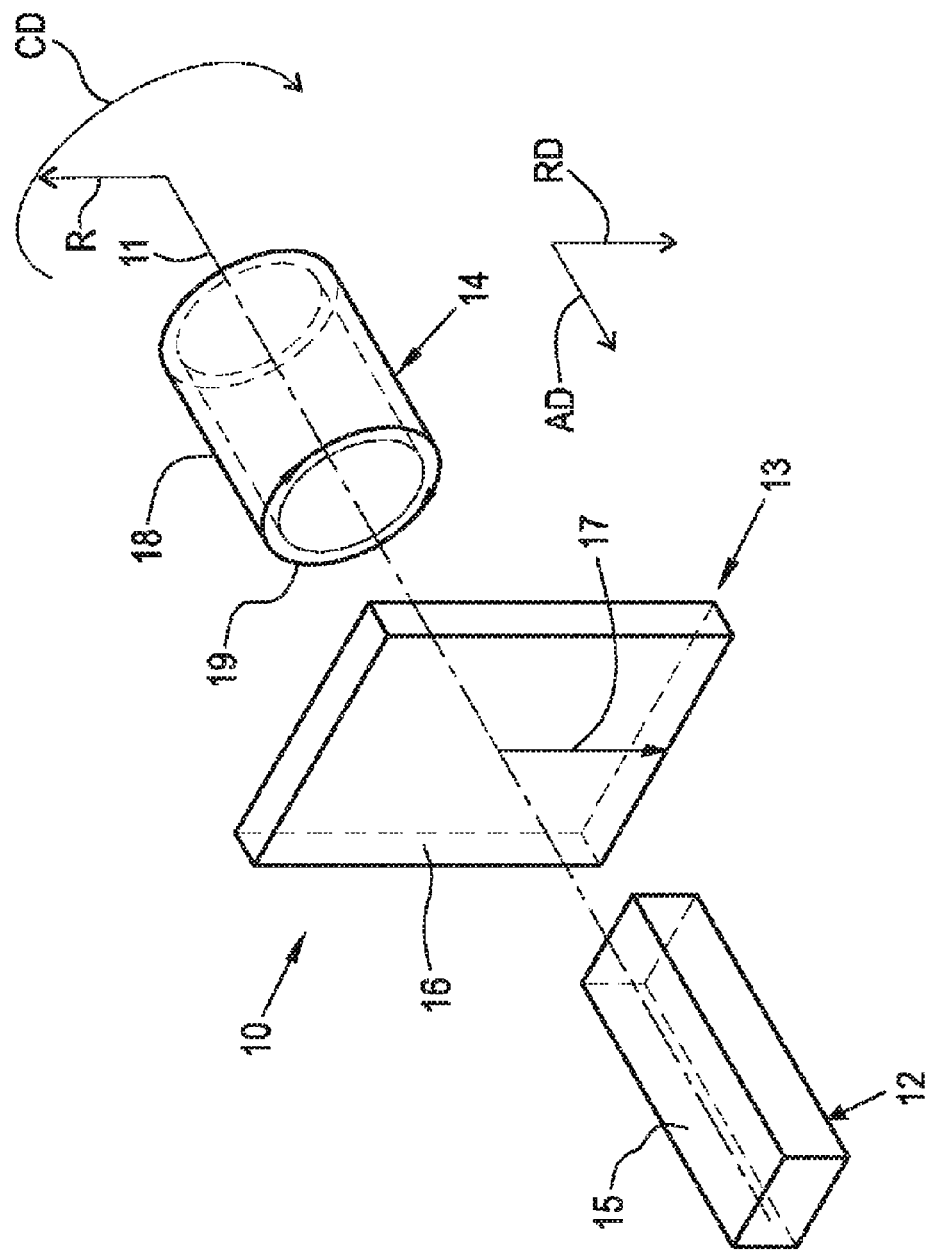
FIG. 1 is a perspective view of a cylindrical coordinate system demonstrating spatial terminology used in the present application.

FIG. 1 is a perspective view of a cylindrical coordinate system demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane parallel to axis 11. Axis 11 is coplanar with planar surface 15; however it is not necessary for an axial surface to be coplanar with axis 11. A radial surface, such as surface 16 of object 13, is formed by a plane orthogonal to axis 11 and coplanar with a radius, for example, radius 17. Surface 18 of object 14 forms a circumferential, or cylindrical, surface. For example, circumference 19 forms a circle on surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively.

Figure 2:
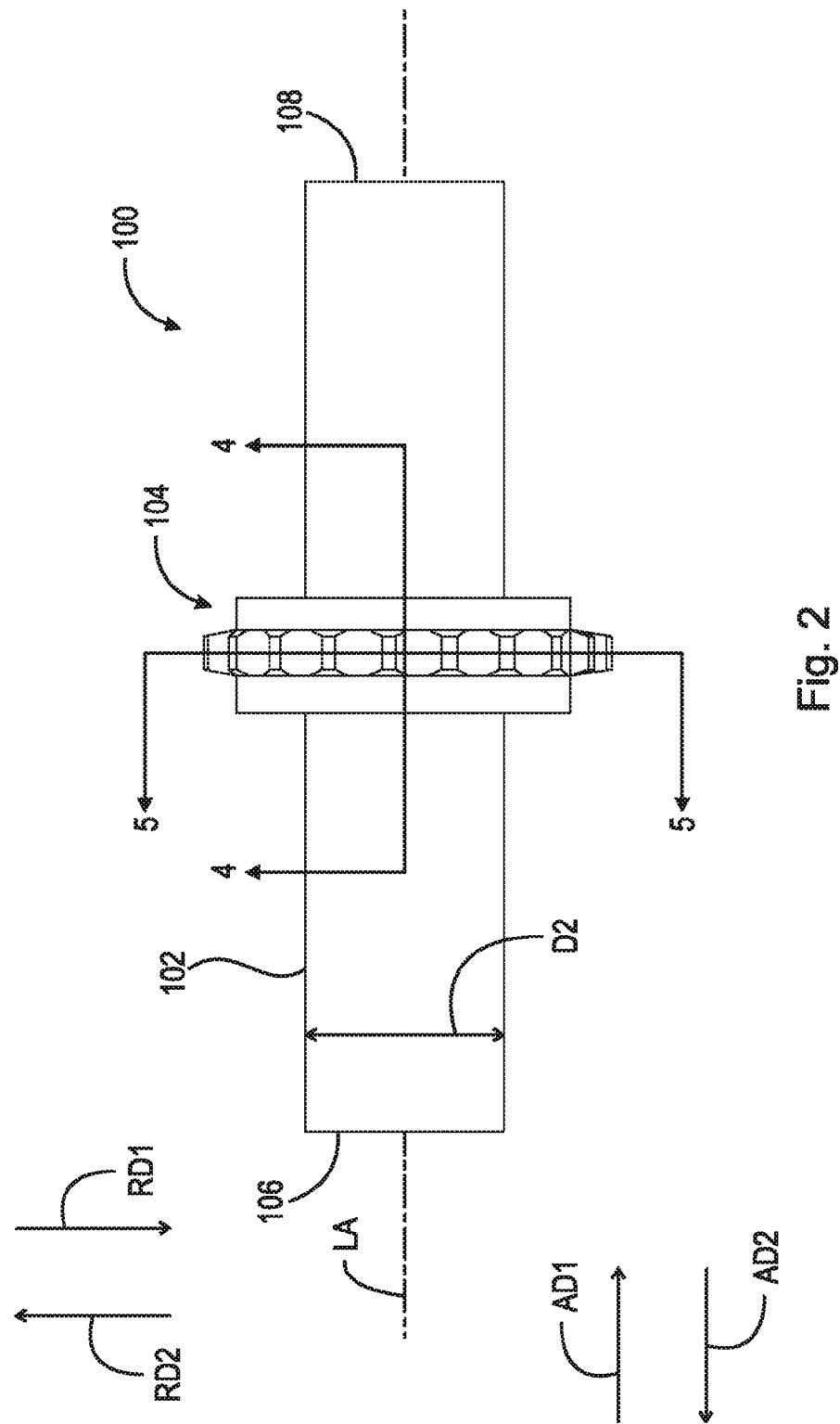
FIG. 2 is a side view of a torque transmitting assembly with a shaft and displaceable sprocket assembly.

FIG. 2 is a side view of torque transmitting assembly 100 with shaft 102 and displaceable sprocket assembly 104.

Figure 3:
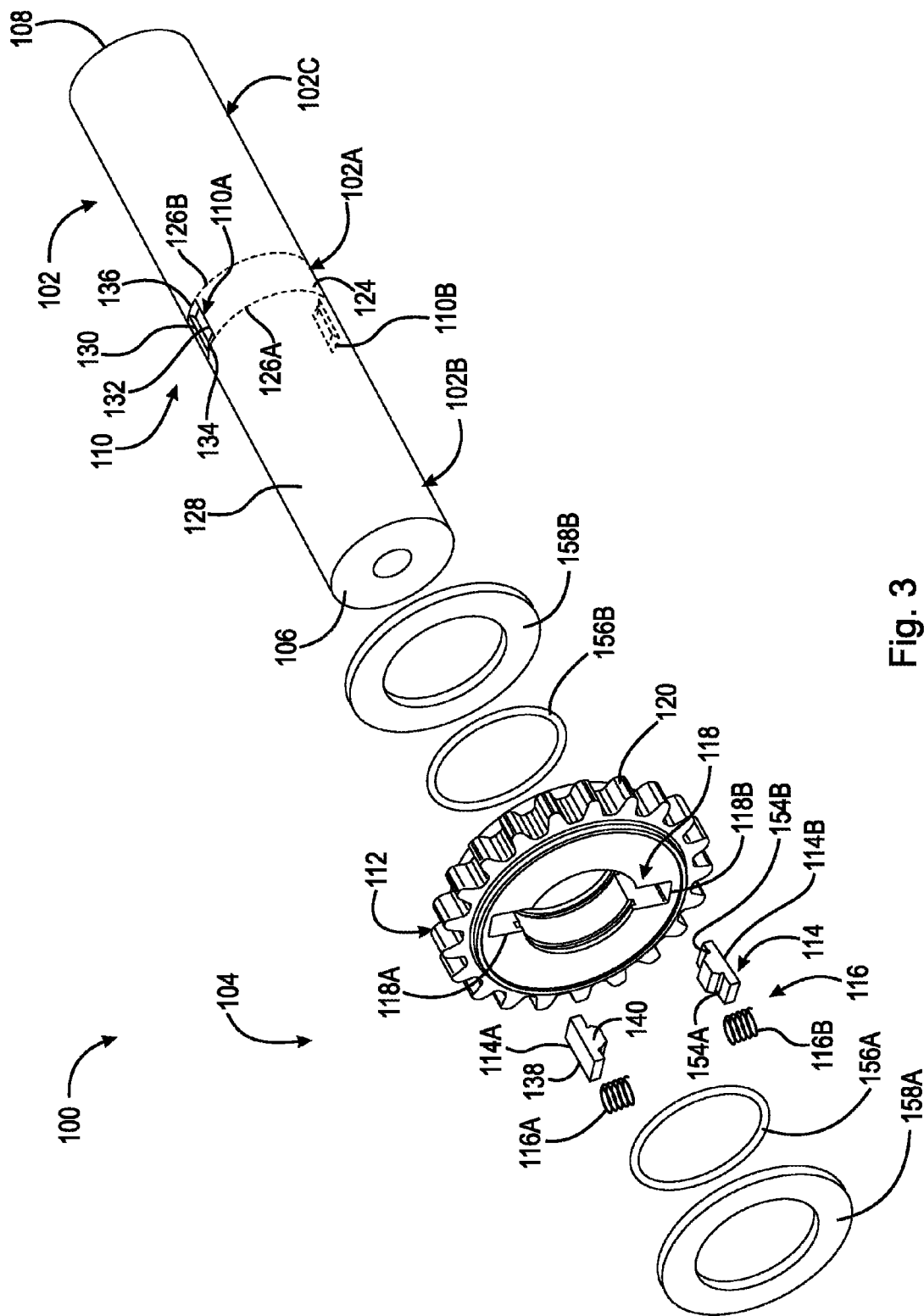
FIG. 3 is an exploded view of the torque transmitting assembly of FIG. 2.

FIG. 3 is an exploded view of torque transmitting assembly 100 of FIG. 2. The following should be viewed in light of FIGS. 2 and 3. Torque transmitting assembly 100 includes shaft 102 and sprocket assembly 104. Shaft 102 includes longitudinal axis LA, longitudinal ends 106 and 108 through which longitudinal axis AR passes, and portions 102A, 102B, and 102C. Portion 102A includes at least one indentation 110. Portions 102B and 102C are located between portion 102A and ends 106 and 108, respectively. Sprocket assembly 104 is disposed about shaft 102 and includes sprocket 112, at least one key 114, and at least one resilient element 116. Sprocket 112 includes at least one slot 118 and circumferentially disposed and radially outwardly extending teeth 120.

Figure 4:
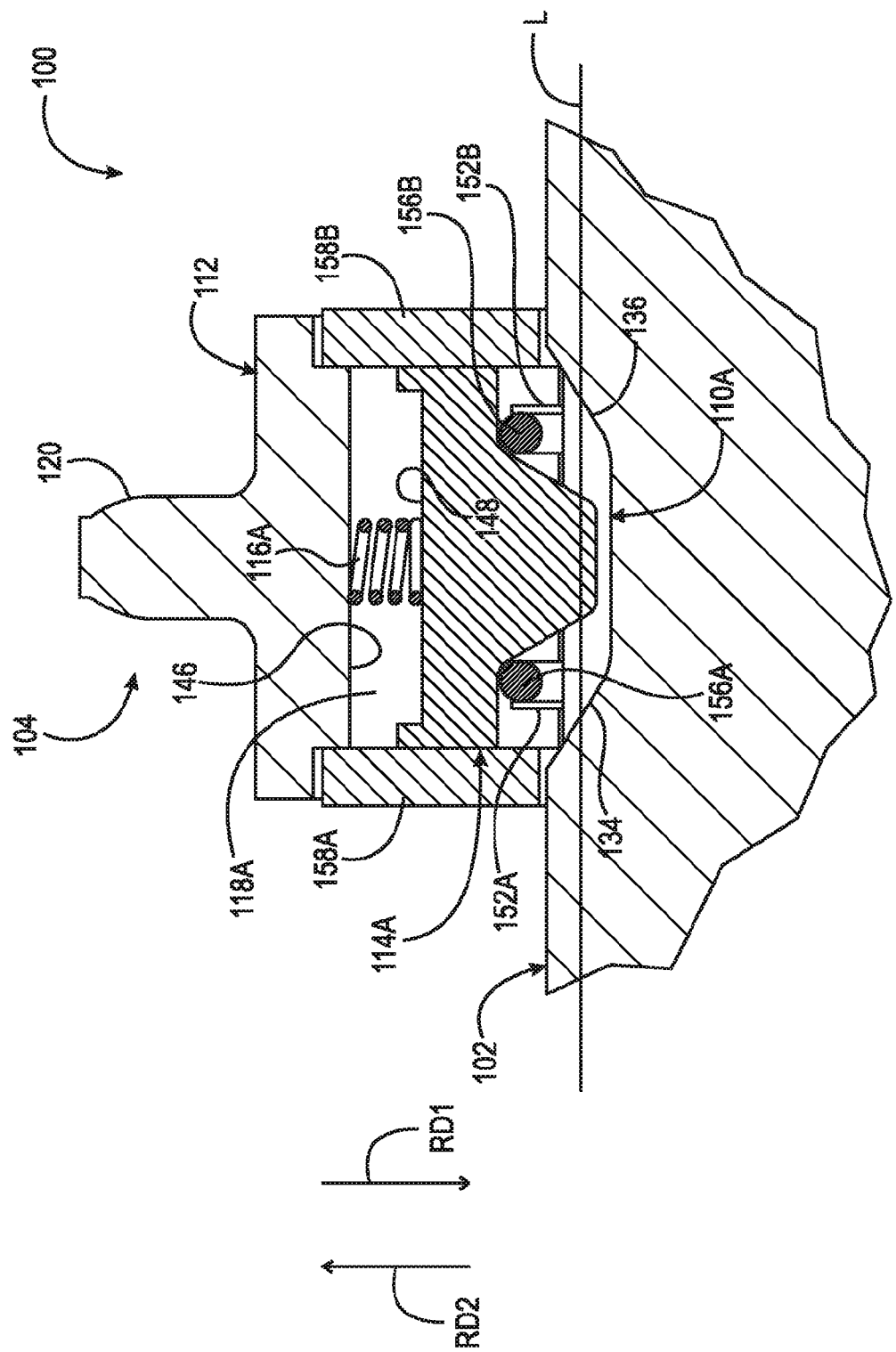
FIG. 4 is a cross-sectional view generally along line 4-4 in FIG. 2.

FIG. 4 is a cross-sectional view generally along line 4-4 in FIG. 2.

Figure 5:
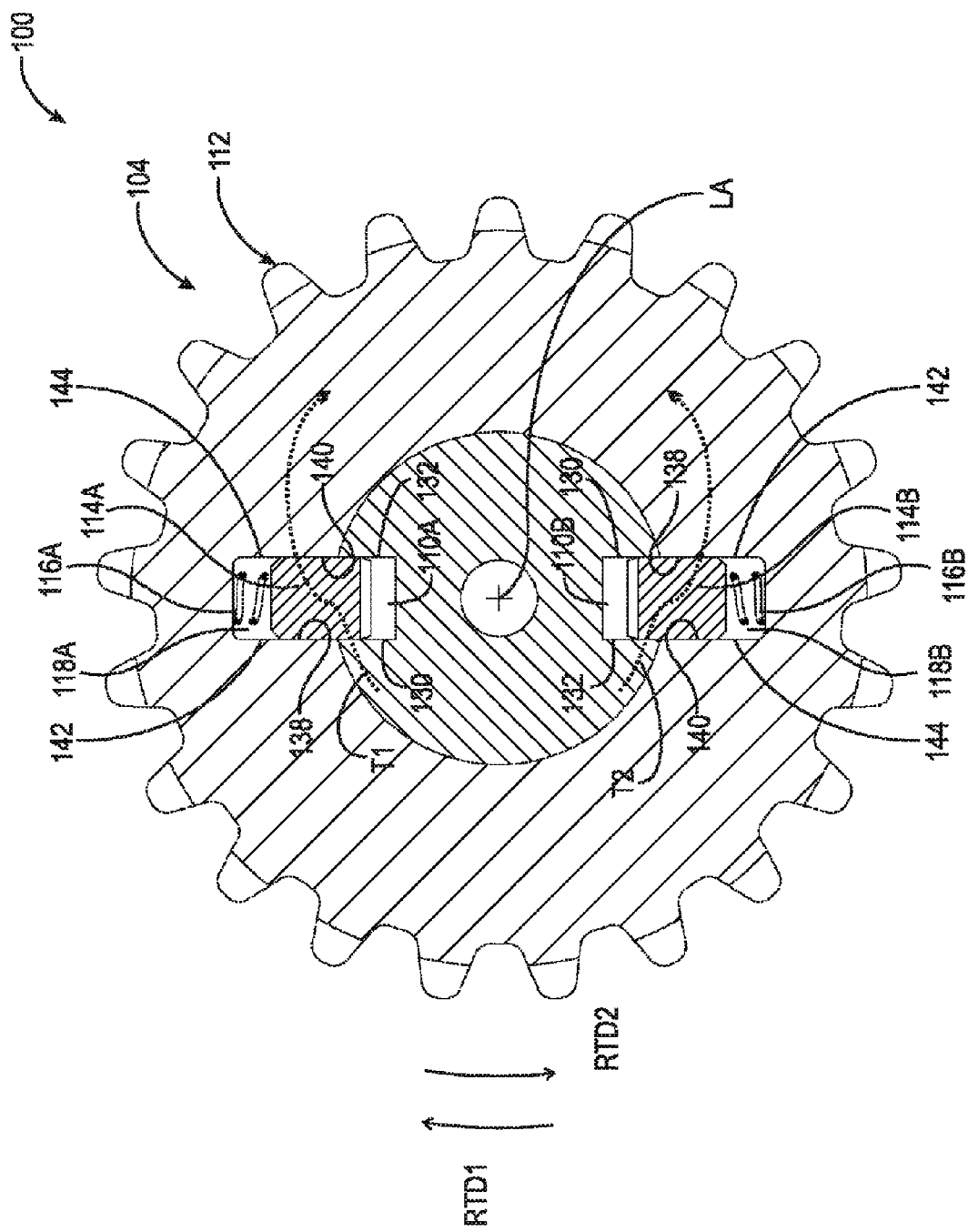
FIG. 5 is a cross-sectional view generally along line 5-5 in FIG. 2.
Figure 6:
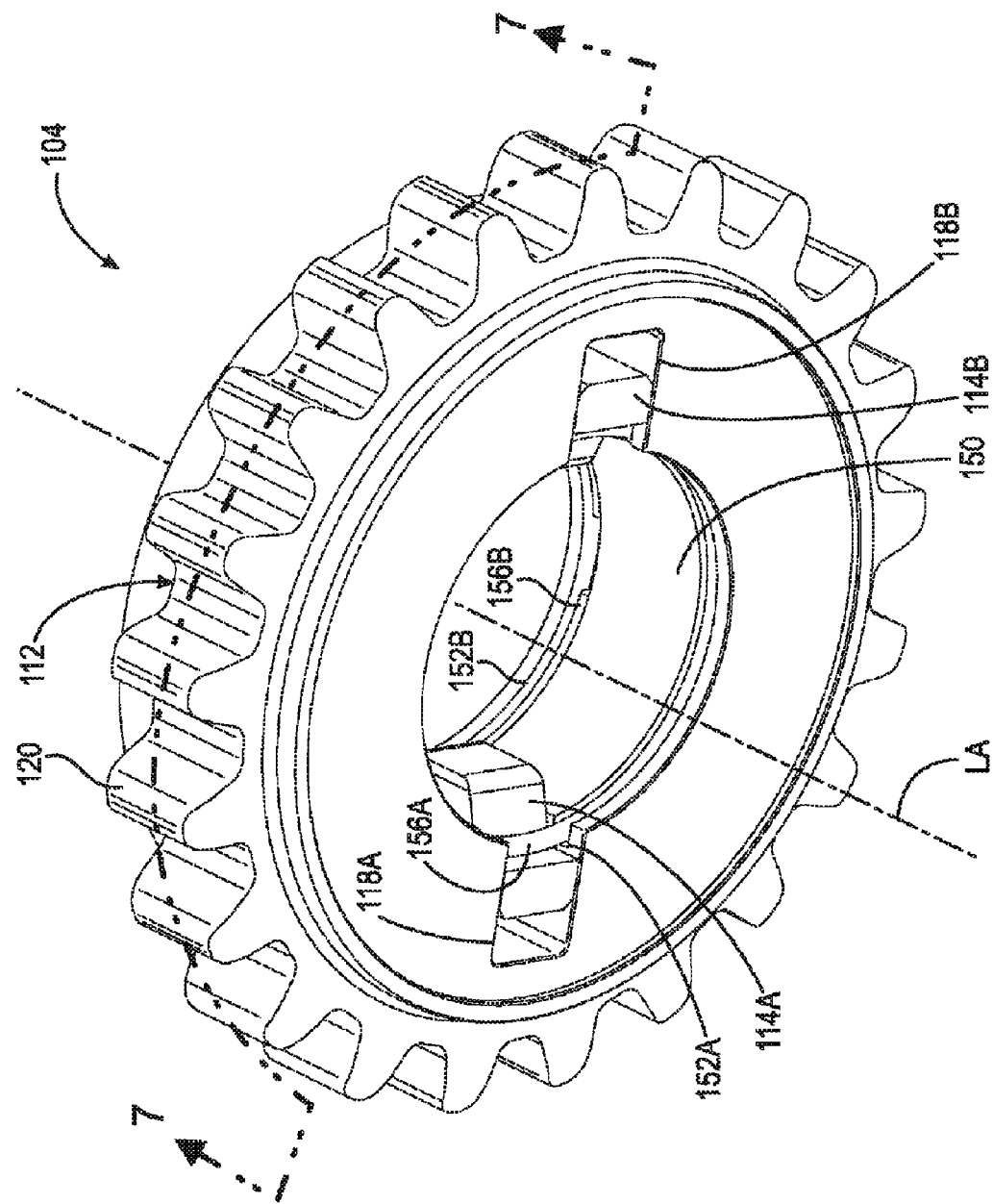
FIG. 6 is a perspective view of the sprocket assembly of FIG. 2 with cover plates removed.

FIG. 5 is a cross-sectional view generally along line 5-5 in FIG. 2;

FIG. 6 is a perspective view of the sprocket assembly of FIG. 2.

Figure 7:
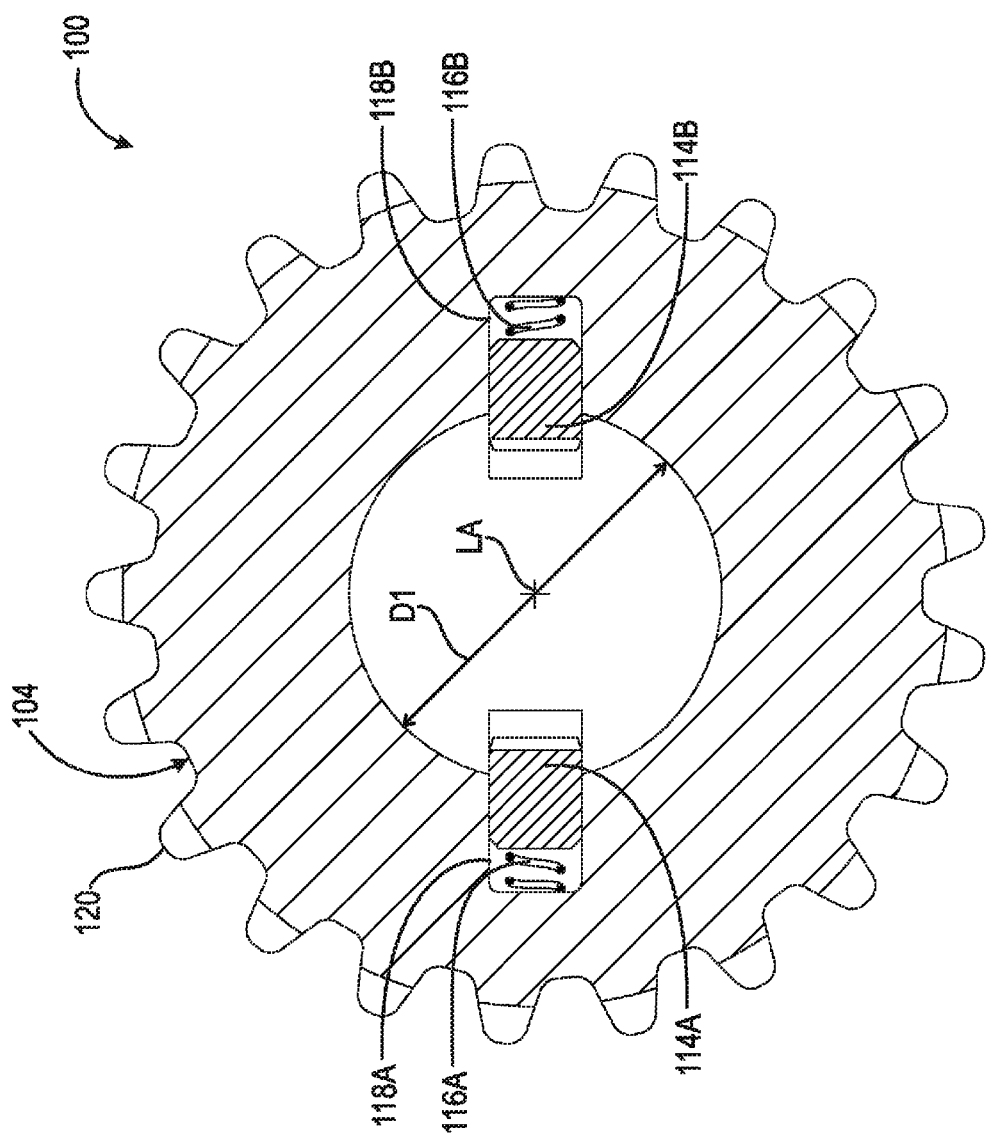
FIG. 7 is a cross-sectional view generally along line 7-7 in FIG. 6.

FIG. 7 is a cross-sectional view generally along line 7-7 in FIG. 6. The following should be viewed in light of FIGS. 2 through 7. In an example embodiment, shaft 102 includes indentations 110A and 110B. In an example embodiment, assembly 104 includes keys 114A and 114B and resilient elements 116A and 116B at least partly disposed in slots 118A and 118B, respectively. In an example embodiment, indentations 110A and 110B, keys 114A and 114B, resilient elements 116A and 116B, and slots 118A and 118B are each 180 degrees separate from each other. To simplify presentation, the discussion that follows is directed to indentation 110A, keys 114A, resilient element 116A, and slot 118A, with the understanding that unless stated otherwise, the discussion is applicable to any other groupings of indentations, keys, resilient elements, and slots, such as indentation 110B, key 114B, resilient element 116B, and slot 118B. Resilient elements 116 can be any resilient elements known in the art, including, but not limited to coil springs and leaf springs.

Resilient element 116A is arranged to urge key 114A in radial direction RD1, orthogonal to axis LA and toward axis LA. Sprocket 112 is non-rotatably connected to shaft 102 when key 114A is at least partly disposed in indentation 110A. Sprocket assembly 104 is displaceable along shaft 102 in opposite axial directions AD2 and AD1, parallel to axis LA, from portion 102A, with key 114A disposed in indentation 110A, to longitudinal ends 106 and 108, respectively. Sprocket assembly 104 is displaceable along shaft 102 in directions AD1 and AD2 from portions 102B and 102C to portion 102A, respectively, to displace key 114A into indentation 110A. Diameter D1 of sprocket 112 is slightly larger than diameter D2 of shaft 102 such that sprocket 112 fits snugly about the shaft but is axially displaceable along the shaft.

When assembly 104 is located about portion 102A, sprocket 112 is rotatable with respect to segments 124 of shaft 102 circumferentially disposed between indentations 110, for example, between indentations 110A and 110B. Sprocket 112 is rotatable for 360 degrees with respect to shaft 102 when assembly 104 is disposed about portions 102B and 102C. Indentation 110A terminates at boundaries 126A and 126B between portion 102A and portions 102B and 102C, respectively.

Key 114A is arranged to displace, with respect to sprocket 112, in radial direction RD1 into indentation 110A as assembly 104 displaces from portion 102B or portion 102C into indentation 110A. Key 114A is arranged to displace, in response to contact with radially outermost surface 128 of shaft 102, in radial direction RD2, opposite radial direction RD1, as assembly 104 displaces from indentation 110A to portion 102B or portion 102C. As assembly 104 displaces from indentation 110A to portion 102B or portion 102C, key 114A is arranged to compress resilient element 116A. As assembly 104 displaces from portion 102B or portion 102C to indentation 110A, resilient element 116A is arranged to displace key 114A in direction RD1. At least respective segments of surface 128 in portions 102B and 102C are at a uniform distance in direction RD2 from axis LA, for example, one half of diameter D2. That is, there are no keys or protrusions extending from surface 128 and there are no grooves in surface 128.

Indentation 110A includes side walls 130 and 132 and end walls 134 and 136 connecting side walls 130 and 132 and positioned so that line L parallel to longitudinal axis LA passes through end walls 134 and 136. End walls 134 and 136 slope from portions 102B and 102C, respectively, toward axis LA in radial direction RD1. As sprocket assembly 104, in particular key 114A, displaces between indentation 110A and portion 102B or portion 102C, key 114A is arranged to slide up end wall 134 or 136, respectively.

Key 114A includes side walls 138 and 140 arranged to engage side walls 130 and 132, respectively, when key 114A is disposed in indentation 110A. Slot 118A includes side walls 142 and 144. Walls 142 and 144 are engaged with side walls 138 and 140, respectively. Torque path T1 is created from shaft 102 to sprocket 112 via side walls 130, 138, 140, and 144 for torque applied to shaft 102 in rotational direction RTD1. Torque path T2 is created from shaft 102 to sprocket 112 via side walls 132, 140, 138, and 144 for torque applied to shaft 102 in rotational direction RTD1. For torque applied to sprocket 112, paths T1 and T2 are reversed.

Slot 118A includes bottom surface 146 connected to walls 142 and 144. Key 114A includes engagement surface 148 and resilient element 116A is engaged with engagement surface 148 and bottom surface 146 to urge key 114A in radial direction RD1.

In an example embodiment: sprocket 112 includes radially innermost surface 150 with grooves 152A and 152B circumferentially disposed about at least a portion of surface 150, that is, between slots 118, and separated in axial direction AD1; key 114A includes grooves 154A and 154B; and assembly 104 includes snap ring 156A disposed in grooves 152A and 154A and snap ring 156B disposed in grooves 152B and 154B. Snap rings 156A and 156B urge key 114A in direction RD2, for example to hold key 114A in place when assembly 104 is not disposed about shaft 102.

In an example embodiment, assembly 104 includes cover plates 158A and 158B fixedly secured to sprocket 112 by any means known in the art. Key 114A is restrained in directions AD1 and AD2 by cover plates 158A and 158B, while remaining displaceable in directions RD1 and RD2 with respect to cover plates 158A and 158B. In some applications of assembly 100, cover plates 158A and 158B act as thrust washers.

Although assembly 100 is shown with a particular number and configuration of components, it should be understood that assembly 100 is not limited to a particular number and configuration of components. For example, assembly 100 can include a single indentation 110, a single key 114, a single element 116 and a single slot 118. For example, assembly 100 can include more than two each of indentations 110, keys 114, elements 116 and slots 118. Further, indentations 110 and slots 118 can be circumferentially disposed and spaced in configurations other than that shown in the figures.

Figure 8:
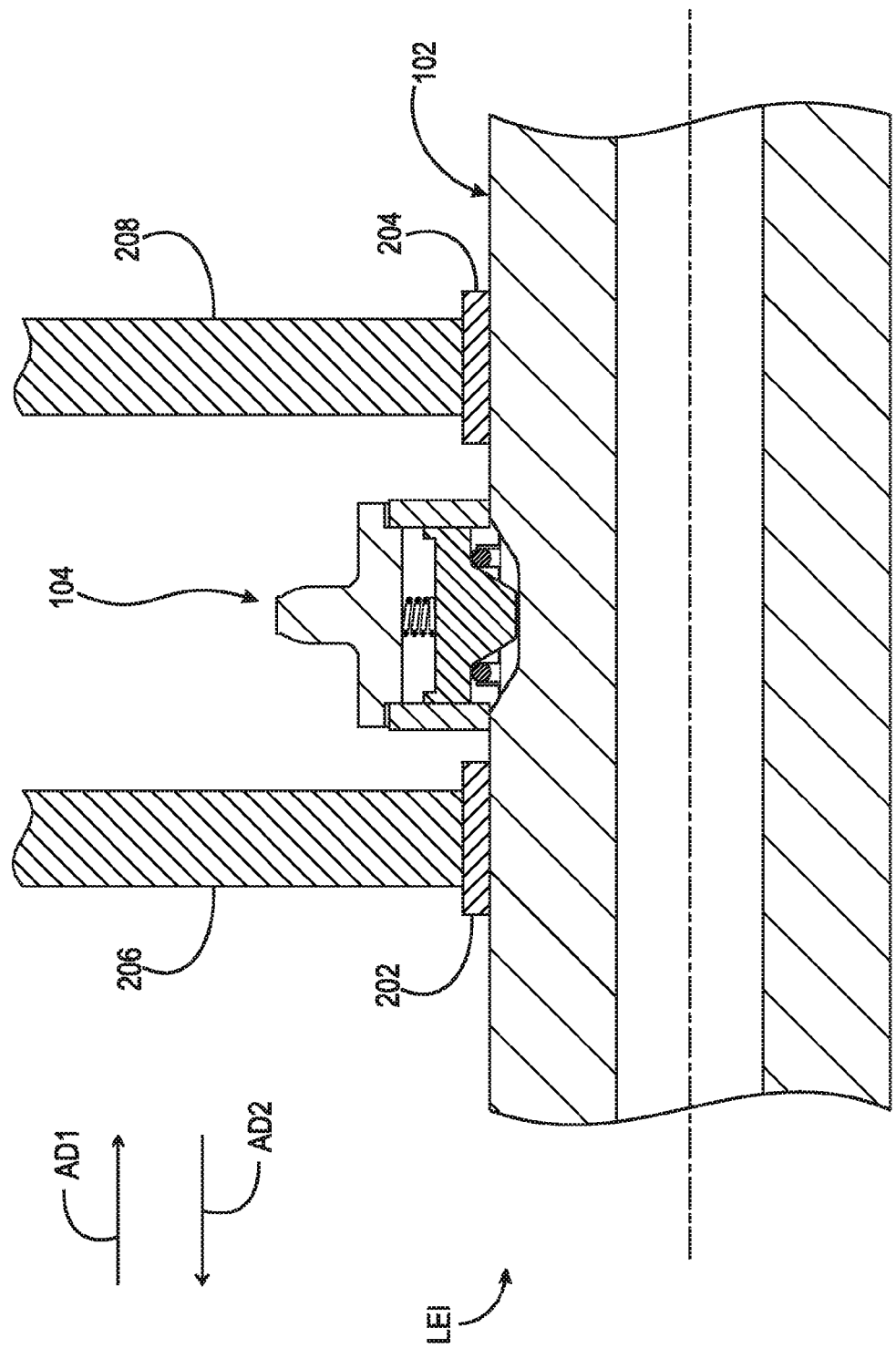
FIG. 8 illustrates a torque transmitting assembly in a torque converter/transmission configuration; and, FIG. 9 is a block diagram of a torque transmitting assembly in a torque converter/transmission configuration.

FIG. 8 illustrates torque transmitting assembly 100 in a torque converter/transmission configuration.

FIG. 9 is a block diagram of torque transmitting assembly 100 in a torque converter/transmission configuration. In an example embodiment, shaft 102 is an input shaft for transmission T. As part of the connection of torque converter TC to transmission T including shaft 102, bushings 202 and 204 must be fixed to shaft 102 so that when torque converter TC is connected to transmission T, housing 206 for the torque converter and stator shaft support 208 of the transmission engage bushings 202 and 204, respectively. Shaft 102 rotates with respect to housing 206 and support 208, and bushing 202 and 204 provide wear and friction reduction as well as seals.

As noted above, known techniques and components cannot be used to install a sprocket in the location shown in FIG. 8 because: a key on the shaft would prevent installation of bushings 202 and 204; a groove in the shaft would provide a leakage path past bushings 202 and 204, and welding would prevent removal of the sprocket for disassembly of the transmission. Advantageously, assembly 100 provides the means for installing a sprocket as shown in FIG. 8, without interfering with installation of bushings or providing leakage paths, and while enabling removal of the sprocket for disassembly operations.

Specifically, in one example, assembly 104 is inserted over one end of shaft 102, for example, end LE1. Due to the relationship of diameters D1 and D2, assembly 104 fits over shaft 102 and can be pushed in direction AD1 towards indentation 110. As assembly 104 slides along shaft 102 in direction AD1, keys 114A and 114B are urged against the shaft by elements 116A and 116B, respectively, and the shaft pushes the keys in direction RD2 against the urging of the resilient elements. As assembly 104 reaches portion 102A, there are two possibilities. If keys 114 and indentations 110 are circumferentially aligned, keys 114 slide down end walls 134 into indentations 110. If keys 114 and indentations 110 are not circumferentially aligned, assembly 104 or shaft 102 is rotated until indentations 110 are circumferentially aligned and the keys slide over side walls 130 or 132 into indentations 110. Once keys 114 are in indentations 110, assembly 104 and shaft 102 are non-rotatably connected. Thus, in the example sequence above, bushing 204 is installed, assembly 104 is engaged with indentations 110, and bushing 202 is installed.

Advantageously, if disassembly of transmission T is required, assembly 104 can be pushed in either direction AD1 or AD2 so that keys 114 slide along end walls 136 or 134, respectively, and are pushed in radial direction RD2. Once assembly 104 is in portion 102B or 102C, assembly 104 can be pushed in direction AD2 or AD1, respectively, as required, for example, for removal from shaft 102.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A torque transmitting assembly, comprising:
    a shaft including:
        a longitudinal axis;
        first and second longitudinal ends through which the longitudinal axis passes;
        a radially outermost surface;
        a first portion including at least one indentation; and,
        second and third portions between the first portion and the first and second longitudinal ends, respectively; and,
    a sprocket assembly disposed about the shaft and including:
        a sprocket with a plurality of circumferentially disposed and radially outwardly extending teeth; and,
        at least one key engaged with the sprocket, wherein:
            the sprocket assembly is displaceable along the shaft to displace the at least one key into the at least one indentation;
            the sprocket is non-rotatably connected the shaft when the at least one key is disposed in the at least one indentation; and,
            the sprocket is rotatable for 360 degrees about the second and third portions.

2. The torque transmitting assembly of claim 1, wherein the sprocket assembly is displaceable from the first portion, with the at least one key disposed in the at least one indentation, to the first or second longitudinal ends, respectively.

3. The torque transmitting assembly of claim 1, wherein the sprocket assembly is rotatable with respect to segments of the shaft circumferentially disposed between the at least one indentation.

4. The torque transmitting assembly of claim 1, wherein the sprocket assembly is rotatable for 360 degrees with respect to the shaft when the sprocket assembly is disposed about the second or third portion.

5. The torque transmitting assembly of claim 1, wherein the at least one indentation terminates at respective boundaries between the first portion and the second portion and between the first portion and the third portion.

6. The torque transmitting assembly of claim 1, wherein:
the sprocket assembly includes at least one resilient element engaged with the at least one key and urging the at least one key in a second radial direction, opposite the first radial direction;
the at least one resilient element is arranged to displace the at least one key into the at least one first indentation as the sprocket assembly displaces from the second or third portion into alignment with the at least one indentation; and,
the at least one key is arranged to displace, in response to contact with the radially outermost surface of the shaft, in a second radial direction, opposite the first radial direction, as the sprocket assembly displaces from the at least one indentation to the second or third portion.

7. The torque transmitting assembly of claim 1, wherein:
the at least one indentation includes:
first and second side walls; and,
first and second end walls connecting the first and second side walls and positioned so that a respective line parallel to the longitudinal axis passes through the first and second end walls;
the first and second end walls slope from the second and third portions, respectively, toward the longitudinal axis in the first radial direction; and,
as the at least one key displaces between the at least one indentation and the second or third portion, the at least one key is arranged to slide along the first or second end wall, respectively.

8. The torque transmitting assembly of claim 7, wherein:
the at least one key includes third and fourth side walls arranged to engaged the first and second side walls, respectively, when the at least one key is disposed in the at least one indentation;
a first torque path is created from the shaft to the sprocket via the first or second side walls and the third or fourth side walls for first torque applied to the shaft; and,
a second torque path is created from the sprocket to the shaft via the third or fourth side walls and the respective first or second side walls for second torque applied to the sprocket.

9. The torque transmitting assembly of claim 8, wherein:
the sprocket includes at least one slot;
the sprocket assembly includes at least one resilient element disposed in the at least one slot;
the at least one key is at least partially disposed in the at least one slot;
the at least one slot includes:
fifth and sixth side walls engaged with the third and fourth side walls, respectively; and,
a bottom surface connected to the fifth and sixth side walls;
the at least one key includes an engagement surface; and,
the at least one resilient element is engaged with the engagement surface and the bottom surface to urge the at least one key in the first radial direction.

10. The torque transmitting assembly of claim 1, wherein:
the sprocket includes a radially innermost surface with first and second grooves circumferentially disposed about at least a portion of the radially innermost surface and separated in the first axial direction;
the at least one key includes third and fourth grooves; and,
the sprocket assembly includes:
a first snap ring disposed in the first groove and third grooves; and,
a second snap ring disposed in the second groove and fourth grooves; and,
the first and second snap rings urge the at least one key in a second radial direction opposite the first radial direction.

11. The torque transmitting assembly of claim 1, wherein:
the sprocket assembly includes first and second cover plates fixedly secured to the sprocket; and,
the at least one key is:
disposed between the first and second cover plates in the first and second axial directions;
restrained by the first and second cover plates in the first and second axial directions; and,
displaceable with respect to the first and second cover plates in the first radial direction and in a second radial direction, opposite the first radial direction.

12. The torque transmitting assembly of claim 1, wherein:
the at least one indentation includes first and second indentations opposite each other with respect to the longitudinal axis;
the at least one slot includes first and second slots opposite each other with respect to the longitudinal axis;
the at least one key includes first and second keys disposed in the first and second slots, respectively; and,
the at least one resilient element includes first and second resilient elements engaged with the first and second keys, respectively.

13. A torque transmitting assembly, comprising:
an input shaft for a transmission, the input shaft including:
a first portion with at least one indentation; and,
second and third portions between the first portion and first and second longitudinal ends of the shaft, respectively; and,
a sprocket assembly radially disposed about the shaft and including:
a sprocket with a plurality of circumferentially disposed radially outwardly extending teeth; and,
at least one key, wherein:
the at least one indentation terminates at respective boundaries between the first portion and the second portion and between the first portion and the third portion;
the sprocket assembly is displaceable along the shaft:
in a first axial direction from the second portion to the first portion to displace the at least one key into the at least one indentation; and,
in the first axial direction or in a second axial direction, opposite the first axial direction, from the first portion, with the at least one key displaced into the at least one indentation, to the third portion or second portion, respectively; and,
when the sprocket assembly is radially disposed about the first portion:

the at least one key is engaged with the at least one first indentation to non-rotatably connect the sprocket and the shaft; or, the sprocket assembly is rotatable about the shaft to engage the at least one key with the at least one first indentation to non-rotatably connect the sprocket and the shaft.

14. The torque transmitting assembly of claim 13, wherein:
the sprocket includes at least one slot;
the at least one key is at least partially disposed in the at least one slot; and,
the sprocket assembly includes at least one resilient element disposed in the at least one slot and urging the at least one key in a first radial direction toward the shaft.

15. The torque transmitting assembly of claim 13, wherein:
the at least one indentation includes:
first and second side walls; and,
first and second end walls connecting the first and second side walls and positioned so that a respective line parallel to the longitudinal axis passes through the first and second end walls;
the first and second end walls slope from the second and third portions, respectively, toward the longitudinal axis in the first radial direction; and,
as the sprocket assembly displaces between the at least one indentation and the second or third portion, the at least one key is arranged to slide along the first or second end wall, respectively.

16. The torque transmitting assembly of claim 13, further comprising:
a first bushing fixedly secured to the first portion and arranged to engage a torque converter housing; and,
a second bushing fixedly secured to the second portion and arranged to engage a stator shaft support for the transmission.

17. The torque transmitting assembly of claim 13, wherein:
the shaft includes a radially outermost surface; and,
at least respective portions of the radially outermost surface are at a uniform distance, in a radial direction orthogonal to a longitudinal axis for the shaft, from the longitudinal axis.

18. A torque transmitting assembly, comprising:
a shaft including:
a longitudinal axis;
first and second longitudinal ends through which the longitudinal axis passes;
a first portion including at least one indentation; and,
second and third portions between the first portion and the first and second longitudinal ends, respectively; and,
a sprocket with a plurality of circumferentially disposed and radially outwardly extending teeth, wherein:
the sprocket is displaceable along the shaft to engage the at least one indentation to non-rotatably connect the sprocket and the shaft; and,
the sprocket is rotatable for 360 degrees about the second and third portions.

19. The torque transmitting assembly of claim 18, further comprising:
a sprocket assembly including:
the sprocket;
at least one key engaged with the sprocket; and,
at least one resilient element arranged to displace the at least one key into the at least one indentation.

20. The torque transmitting assembly of claim 19, wherein the sprocket assembly is displaceable along the shaft to:
slide the at least one key along a radially outermost surface of the shaft in the second and third portions;
slide the at least one key into the at least one indentation.

* * * * *